United States Patent [19]

Kennison et al.

[11] 3,898,351

[45] Aug. 5, 1975

[54] SUBSTRATE CLEANING PROCESS

[75] Inventors: Robert E. Kennison, Essex Center; Wendell J. Stetson, Hinesburg, both of Vt.

[73] Assignee: International Business Machines Corporation, Armonk, N.Y.

[22] Filed: May 26, 1972

[21] Appl. No.: 257,091

[52] U.S. Cl. ........................ 427/57; 134/1; 252/156; 252/DIG. 10; 427/271; 427/287; 427/294; 427/299

[51] Int. Cl.[2] ........................................ C03C 17/08

[58] Field of Search....... 117/54, 8.5, 107, 93.1 GD, 117/124 C, 47 R, DIG. 8; 134/1, 2, 29; 252/156, DIG. 10

[56] References Cited

UNITED STATES PATENTS

| | | | |
|---|---|---|---|
| 1,844,933 | 2/1932 | Cyganick | 252/DIG. 10 |
| 2,296,097 | 9/1942 | Emiley | 252/DIG. 10 |
| 2,961,354 | 11/1960 | Cleveland | 117/DIG. 8 |
| 2,994,330 | 8/1961 | Catlin et al. | 134/1 |
| 3,446,666 | 5/1969 | Bodine | 134/1 |
| 3,679,589 | 7/1972 | Schnegelberger et al. | 252/DIG. 10 |
| 3,695,908 | 10/1972 | Szupillo | 117/54 |
| 3,703,470 | 11/1972 | Brennan | 252/DIG. 10 |
| 3,715,244 | 2/1973 | Szupillo | 117/106 R |

OTHER PUBLICATIONS

"Products Finishing" Dec. 1968, pp. 58–70.

*Primary Examiner*—John H. Newsome
*Attorney, Agent, or Firm*—Howard J. Walter, Jr.

[57] ABSTRACT

A four-step cleaning process is used for cleaning substrates, such as glass plates, to allow vacuum deposition of pinhole free films, such as chromium films for the fabrication of chromium masks, on the plates. The plates are first brush scrubbed in an aqueous bath. They are then ultrasonically pulsed in a second aqueous bath. The first and second aqueous baths may contain additives, such as sodium bicarbonate, to enhance the cleaning effect. The plates undergo an overflow rinse in purified water until a predetermined resistivity measurement, such as 8 megohms, is obtained. The plates are then spin dried. In the fabrication of chromium masks, a film of chromium is then vacuum evaporated or sputtered on the plates, followed by selective removal of chromium, such as by a photoresist and etching step, to give a desired image pattern.

5 Claims, No Drawings

SUBSTRATE CLEANING PROCESS

FIELD OF THE INVENTION

This invention relates to a process for cleaning a substrate sufficiently to allow the pinhole-free deposition of a film on it. More particularly, it relates to a process suitable for cleaning such substrates as glass plates to allow the repeatable fabrication under manufacturing production conditions of chromium masks used in the fabrication of integrated circuits.

DESCRIPTION OF THE PRIOR ART

The fabrication of chromium masks, widely used in the production of integrated circuits, has hitherto been regarded as more of an art than a science. It is known that the fabrication of such chromium masks on a reproducible basis depends on the ability to obtain adequate adhesion between the chromium film and its glass substrate. It has further been recognized that adequate adhesion is largely dependent upon the provision of a thoroughly clean substrate. For this reason, a wide variety of cleaning processes have been employed, but none has hitherto proved to be capable of providing a reliably clean substrate on a reproducible basis.

For this reason, a pattern has developed in the integrated circuit industry of purchasing glass plates already containing a film of chromium deposited on them from commerical sources. The precise nature of cleaning processes employed by these commercial sources in the fabrication of their chromium coated glass plates is proprietary. However, even these commercially obtainable chromium coated glass plates tend to show undesirable variations in their quality. Lack of a uniform high quality in the chromium films deposited on these glass substrates produces pinhole defects in integrated circuit masks fabricated using these coated glass plates.

The prior art discloses cleaning processes which might be regarded as promising candidates for use in cleaning glass plates prior to the deposition of chromium films on them. For example, U.S. Pat. 3,585,668 discloses a cleaning process for semiconductor wafers comprising the sequential steps of scrubbing in a detergent solution, impact rinsing and spin drying. U.S. Pat. No. 3,050,422 discloses a cleaning process for glass lenses including the sequential steps of ultrasonically vibrating the lenses in a strong alkali cleaning solution while bubbling air through the cleaning solution, spray rinsing, ultrasonically vibrating the glass lenses in a deionized water rinse solution while bubbling air through the solution, and infrared drying. Neither of these processes will produce consistent reproducible results when used to clean glass plates for the fabrication of chromium masks.

Attempts to clean glass plates by non-aqueous chemical solutions result in poor results due to contamination, present a more hazardous working environment than an aqueous cleaning process, and give difficult waste disposal problems.

The cleaning of glass plates for the manufacture of glass masks will continue to increase in criticality as the complexity of mask patterns for advanced integrated circuits increases.

SUMMARY OF THE INVENTION

Accordingly, it is an object of the invention to provide an improved aqueous cleaning system for substrates on which thin films are deposited.

It is another object of the invention to provide a substrate cleaning process that will reliably allow pinhole-free films to be vacuum deposited on the substrate under manufacturing conditions.

It is still another object to provide a glass cleaning process that gives a surface on glass plates suitable for vacuum deposition of defect-free chromium films in the manufacture of chromium masks used to make integrated circuits.

It is yet another object of the invention to provide a process which will give consistent reproducible results in the cleaning of substrates for thin film deposition under manufacturing conditions, which is not hazardous to operating personnel, and which does not produce a significant waste disposal problem.

It is a further object of the invention to provide an aqueous cleaning process for glass plates that will permit the fabrication of chromium masks under manufacturing conditions suitable for advanced integrated circuits currently under development.

It is desired for the fabrication of integrated circuits in the current state of the art to have the chromium masks be free of pinholes above 2.0 microns in diameter. Of course, it would be desired to have the masks be completely free of all pinholes, regardless of size. However, pinholes below 2.0 microns usually will not be reproduced in photoresist exposed through the mask. Consequently, as used herein, the term "pinhole free" means that the film contains no pinholes above 2.0 microns in size.

The term "pinhole" refers to a hole in a thin film caused by localized loss of adhesion of the film to its substrate, with a small hole resulting where the film breaks away. The term "deionized water" refers to water that has been scavenged by ion-exchange media to give relatively colloidal free water.

The attainment of the above and related objects may be obtained using the described cleaning process. A substrate on which a film is to be vacuum deposited is first mechanically scrubbed in an aqueous bath, which may be simply deionized water or may contain various additives to enhance the cleaning effect, such as sodium bicarbonate. The substrate is then ultrasonically pulsed, also in an aqueous bath, preferably not the same bath as used for the mechanical scrubbing. Again, such additives as sodium bicarbonate may be used to enhance the cleaning effect. The substrate is then thoroughly rinsed with deionized water, preferably until a predetermined resistivity measurement is obtained in the rinse water. The substrate is then spun dry to remove water from it without spotting. Until spun dry, essentially no drying of water should occur, to avoid spotting problems. This is desirably accomplished by keeping the substrate immersed in the solutions used to produce the process.

Although the process of this invention is particularly suited for cleaning glass plates on which thin chromium films of from about 500 to about 1,000 angstroms thickness are vacuum evaporated or sputter deposited in the fabrication of chrome masks, it should be readily apparent that the superior cleaning results obtained with the present four-step process make it of value for providing increased and more uniform adhesion of thin films vacuum deposited on a wide variety of substrates for a wide variety of purposes.

The foregoing and other objects, features and advantages of the invention will be apparent from the following more particular description of the preferred embodiments of the invention.

DETAILED DESCRIPTION OF THE INVENTION

The following detailed description is in terms of procedures giving the best results from the invention for the purpose of fabricating chromium masks used to make integrated circuits. However, most of what is said is pertinent to practice of the invention for deposition of other thin films than chromium on other substrates than glass plates.

A mechnical scrubbing action is necessary to remove contaminants on glass plates as the first step in the process. For this purpose a submersible motorized nylon bristle brush, lambs wool roller, or synthetic fiber roller may be used for thorough scrubbing of all four edges and both sides of the glass plates. To enhance the cleaning effect, inorganic cleaning agents, such as sodium bicarbonate and the like, soaps, cationic, anionic or nonionic detergents, and the like may be added to the solution. The preferred additive is sodium bicarbonate, either alone or in the form of Sparkleen cleaning agent, commercially available from the Calgon Company, Pittsburgh, Pa., and consisting of sodium bicarbonate, calcium carbonate, and a small quantity of a wetting agent. If Sparkleen is employed, 100 ml of the Sparkleen cleaning agent is added to 2 gallons of deionized water. The solution is preferably heated to about 40°C during the cleaning operation, and the glass plates desirably remain immersed during the scrubbing operation.

In the second step of the process, the glass plates are placed in a second deionized water bath, also desirably containing the same ratio of Sparkleen and maintained at the same temperature. The plates are ultrasonically agitated at about 5 to 10 cavin energy level for about 1 hour.

For the rinse step of the process, a deionized water overflow tank with a flow rate of, for example, 2½ gallons per minute is used. As is well known, the introduction of impurities in deionized water makes it more conductive, thus lowering its resistivity. Thus, a convenient method of measuring the thoroughness of a rinse operation is to measure the resistivity of the rinse water. In practice, the rinse operation is therefore continued until a predetermined resistivity measurement is obtained. For this purpose, when the resistivity of the rinse water recovers to about 8 megohms, the rinse is adequate. To assure completeness of the rinse, a higher resistivity level, such as 12 megohms, may be selected. Under the conditions described, about 5 minutes is adequate to give a resistivity of not less than 8 megohms.

In practice, it is now preferred to place the rinsed glass plates in a second deionized water overflow tank, and then to remove them singly for the spin drying operation. The backside of the glass plate is blown dry with filtered nitrogen, and the glass plate is rotated at 2000 rpm for 40 seconds. At the start of rotation, a small quantity, such as 7 ml, of deionized water is dispensed slowly onto the center of the plate and then allowed to spin dry. Drying is completed in about 20 seconds, but the extra time is allowed to assure completion.

The glass plates are now ready for deposition of chromium. Either vacuum evaporation or sputtering may be employed for this purpose. A thickness of about 600–800 angstroms is desired in the chromium thin film. If vacuum evaporation is employed, it is carried out from a high purity chromium source at a deposition rate of about 350 angstroms per minute in a vacuum evaporation chamber at a pressure of about $2 \times 10^{-5}$ torr. If sputtering is employed, a commercially available system, such as a Bendix Scientific Instrument AST 601 Sputtering System with a DC triode option may be employed. This system is a low profile, low energy sputtering system and utilizes substrate rotation. A high purity chromium target is used and is 8 inches in diameter. A holder for the glass plates is about 25 inches in diameter and holds 24 glass plates of 3.5 inches square size.

The system is pre-pumped through a pressure of $1.5 \times 10^{-5}$ torr, then backfilled with argon to a pressure of 0.8 millitorr. A target power of 800 volts and 500 to 540 milliamperes is utilized, and the sputtering is carried out at a rate of about 70 angstroms per minute per plate. The preferred form of vacuum deposition is sputtering.

The following nonlimiting examples describe the invention further.

EXAMPLE I

A variety of cleaning processes are tried in an attempt to identify a particular process that will give a satisfactory surface for deposition of uniform, high quality chromium films on glass plates in a mask manufacturing environment. The processes tried are listed below.

1. Ultrasonic pulsing in 80°C Neutra Clean phosphate detergent aqueous solution, overflow aqueous rinse at 80°C, overflow rinse in deionized water, two ultrasonic alcohol rinses, trichloroethylene ultrasonic rinse, Freon vapor clean and dry.
2. Same as (1) but with spray aqueous rinse at 80°C.
3. Ultrasonic pulsing at 75°C in Cellosolve solvent, two alcohol spray rinses, trichloroethylene spray rinse, Freon vapor clean and dry.
4. Ultrasonic pulsing at 75°C in Cellosolve solvent, overflow aqueous rinse at 80°C, then entire process 2.
5. Aqueous spray rinse at 80°C, then entire process 3.
6. Hydrochloric acid etch, then entire process 1.
7. Process 1, but with substitution of perchloroethylene for Neutra Clean solution.
8. Scrub with a paste of calcium carbonate and sodium hydroxide, overflow aqueous rinse at 80°C, overflow rinse in deionized water, alcohol rinse, alcohol vapor clean and dry.
9. Scrub with $CaCO_3$—NaOH paste as in process 8, then entire process 1.
10. Scrub with $CaCO_3$—NaOH paste as in process 8, overflow aqueous rinse at 80°C, hydrochloric acid etch, then all except first step of process 1.
11. $CaCO_3$ paste scrub, then entire process 7.
12. Entire process 9, then bake at 130°C prior to deposition.
13. Substitute Sparkleen cleaning agent at room temperature for Neutra Clean detergent solution in process 1.
14. $CrO_3$ etch, then entire process 13.
15. $CrO_3$ etch, tap water rinse, $CaCO_3$ paste scrub, then entire process 13.
16. $CrO_3$ etch, then entire process 9.

17. Ultrasonic pulsing in 45°C Sparkleen cleaning agent aqueous solution, $CaCO_3$ paste scrub, then all except first step of process 1.

18. Mechanical scrubbing in Sparkleen cleaning agent aqueous solution, ultrasonic pulsing in Sparkleen cleaning agent aqueous solution, overflow rinsing in deionized water, spin dry.

All plates cleaned in the foregoing processes are coated with chromium by the previously described vacuum evaporation or sputtering processes. After deposition, all plates are subjected to ultrasonic agitation at about 5 cavins energy level for 10 minutes, then inspected for pinholes. Pinholes ranged in number from 0 in the case of process 18 to 80 per square inch in the case of processes 8 and 9. All of the processes except 18 showed a variety of other objectionable film defects, or a high pinhole count.

Based on the above results, the cleaning process consisting of the four steps of rotating brush scrubbing, ultrasonic pulsing, overflow rinse to a resistivity of about 8 megohms and spin drying is selected as showing the most promise for use in a manufacturing environment to give uniform, high quality chromium films on the glass plates.

EXAMPLE 2

The above four step cleaning procedure was utilized together with the above vacuum deposition processes to manufacture a total of 3,200 masks. For comparative purposes, masks were fabricated from commercially available chromium coated glass plates, obtained from the Bell and Howell Company, Chicago, Ill. In each case, the chromium coated glass plates were subjected to 10 minutes of ultrasonic pulsing in deionized water at 5 cavins energy level in order to produce pinholes at potential pinhole sites in the chromium films.

As a criteria for inspection, any mask having a density of pinholes of a size greater than 1.25 microns of more than 15 pinholes per square inch is unacceptable. Ninetyfive percent of the masks fabricated from the chromium coated glass plates cleaned in the four step process meet the specifications. This yield exceeds that obtained from the commercially available chromium coated glass plates by an average of about 40%.

Testing reveals that 37% of the masks made from glass plates cleaned in accordance with the invention contain no defects above 1.25 microns in size, while only 17.5% of the masks from the commercially available chromium glass plates are defect free.

EXAMPLE 3

The procedure described above for the four step cleaning process was repeated, but with a variety of commercial glass cleaners, household detergents, and soaps added to the scrubbing and ultrasonic baths. For comparative purposes, the process utilizing Sparkleen cleaning agent was carried out and plates cleaned using it were used in each vacuum deposition run. From each vacuum deposition run, four plates cleaned with the Sparkleen cleaning agent solution in the four step and six plates from two different variations of the four step process were inspected. In each case, the counts of pinholes greater than 2.0 microns in size are given in Table II.

TABLE II

| PINHOLE COUNT EACH PLATE | | |
|---|---|---|
| Control - 4 plates | Exp. Group I (6 plates) | Exp. Group II (6 plates) |
| Sparkleen Std. | Hot Deionized Water | $CaCO_3$ |
| 1, 4, 1, 0 | 1, 0, 1, 30+, 6, 3 | 2, 30+, 0, 10, 2, 4 |
| | $NaHCO_3$ | $NaHCO_3$—$CaCO_3$ |
| 30+, 3, 30+, 8 | 0, 0, 0, 0, 0, 0 | 1, 2, 2, 1, 0, 0 |
| | Renex 31 cleaning agent | Rainbath water softener |
| 2, 2, 2, 6 | 0, 1, 1, 0, 3, 5 | 1, 9, 3, 0, 1, 1 |
| | Acationox cationic cleaning agent | Phisohex skin cleaner |
| 1, 0, 0, 0 | 7, 3, 3, 2, 13, 30+ | 15, 20, 28, 2, 30+, 30+ |
| | Alconox cleaning agent | Green liquid soap |
| 2, 2, 7, 3 | 4, 0, 3, 0, 0, 0 | 0, 3, 1, 1, 1, 4 |
| | All (dishwasher) detergent | Ivory Liquid detergent |
| 0, 2, 0, 1 | 2, 1, 0, 0, 0, 0 | 1, 1, 0, 0, 1, 0 |
| | Ivory Snow soap | Tide detergent |
| 1, 0, 10, 6 | 1, 2, 0, 1, 0, 1 | 0, 0, 0, 0, 1, 0 |
| | $NaHCO_3$ | Joy detergent |
| 0, 1, 0, 0 | 0, 0, 0, 0, 0, 0 | 0, 0, 0, 3, 0, 1 |
| | Cold Deionized Water | $NaHCO_3$ & Cold deionized water |
| 1, 2, 0, 0 | 5, 5, 1, 0, 0, 0 | 0, 1, 0, 0, 0, 0 |

The above results show that deionized water alone gives good results with the four step cleaning process. The cleaning may be enhanced by a wide variety of additives, such as commercially available glass cleaners, household detergents, and soaps. The best additive for this purpose is sodium bicarbonate.

It should now be apparent that a process capable of achieving the stated objects has been provided. The four step cleaning process provides glass plates on which relatively pinhole free films can be vacuum deposited under manufacturing conditions. In particular, yields of about 95% of acceptable chromium masks are consistently obtainable using this process, with more than one-third of the masks being pinhole free. These results represent a decided improvement over yields obtained with prior art techniques and indicate that this cleaning process is suitable for use in the fabrication of masks for advanced integrated circuits now under development.

While the invention has been particularly shown and described with reference to a preferred embodiment thereof, it will be understood by those skilled in the art that various changes in form and detail may be made therein without departing from the spirit and scope of the invention.

What is claimed is:

1. A process for providing pinhole-free vacuum deposited chromium films on a first surface of glass substrates consisting of the steps of:

A. mechanically scrubbing all of the surfaces of a glass substrate while maintaining said substrate submerged in a bath substantially comprising colloidal free deionized water;

B. washing said substrate in an ultrasonically pulsed bath substantially comprising colloidal free deionized water;

C. rinsing said substrate in a flowing colloidal free deionized water bath until the resistivity of said rinse water is at least 8 megohms;

D. spin drying said substrate after dispensing a quantity of colloidal free deionized water on said first surface of said substrate; and E. vacuum depositing a thin chromium film on said first surface of said substrate.

2. The process of claim 1 wherein the baths in step (A) and in step (B) further include an additive comprising substantially sodium bicarbonate.

3. The process of claim 1 wherein said mechanical scrubbing step is carried out by a motorized brush.

4. The process of claim 1 wherein said thin chromium film is about 500 to 1000 angstroms thick.

5. The process of claim 4 including the additional step of defining a desired image pattern by selective removal of portions of said chromium film.

* * * * *